(12) United States Patent
Powell et al.

(10) Patent No.: US 10,978,942 B2
(45) Date of Patent: Apr. 13, 2021

(54) MAGNETICALLY GEARED APPARATUS

(71) Applicant: Magnomatics Limited, Sheffield (GB)

(72) Inventors: David Powell, Sheffield (GB); Gregg Wilson, Sheffield (GB); Ferran Garcia Daras, Sheffield (GB); Radu-Stefan Dragan, Sheffield (GB)

(73) Assignee: Magnomatics Limited, Yorkshire (GB)

( * ) Notice: Subject to any disclaimer, the term of this patent is extended or adjusted under 35 U.S.C. 154(b) by 384 days.

(21) Appl. No.: 16/068,796

(22) PCT Filed: Jan. 5, 2017

(86) PCT No.: PCT/GB2017/050011
§ 371 (c)(1),
(2) Date: Jul. 9, 2018

(87) PCT Pub. No.: WO2017/121986
PCT Pub. Date: Jul. 20, 2017

(65) Prior Publication Data
US 2019/0157962 A1    May 23, 2019

(30) Foreign Application Priority Data

Jan. 13, 2016  (GB) ..................... 1600654

(51) Int. Cl.
*H02K 49/10* (2006.01)
*H02K 16/02* (2006.01)
(Continued)

(52) U.S. Cl.
CPC ............ *H02K 49/102* (2013.01); *H02K 7/11* (2013.01); *H02K 16/02* (2013.01); *H02K 21/44* (2013.01); *H02K 41/033* (2013.01)

(58) Field of Classification Search
CPC ........ H02K 49/102; H02K 7/11; H02K 16/02; H02K 21/44; H02K 41/033
See application file for complete search history.

(56) References Cited

U.S. PATENT DOCUMENTS 6,262,508 B1 * 7/2001 Shibayama ............ H02K 21/00
310/152
8,466,592 B2    6/2013 Atallah et al.
(Continued)

FOREIGN PATENT DOCUMENTS

CN    103001425 A    3/2013
CN    103493338 A    1/2014
(Continued)

OTHER PUBLICATIONS

The GB Search Report dated Nov. 14, 2016, for GB application No. GB1600654.6, 3 pages.
(Continued)

*Primary Examiner* — Jue Zhang
(74) *Attorney, Agent, or Firm* — Lee & Hayes, P.C.

(57) ABSTRACT

A magnetically geared apparatus that includes a first rotor and a stator. The stator can include windings and a first plurality of permanent magnets, where the first plurality of permanent magnets are located between the windings and the first rotor. The stator can also include un-magnetized magnetisable material between circumferentially juxtaposed permanent magnets of the first plurality of permanent magnets.

12 Claims, 4 Drawing Sheets

(51) Int. Cl.
*H02K 7/11* (2006.01)
*H02K 41/03* (2006.01)
*H02K 21/44* (2006.01)

(56) References Cited

U.S. PATENT DOCUMENTS

| | | |
|---|---|---|
| 2012/0169267 A1 | 7/2012 | Nashiki et al. |
| 2012/0194021 A1 | 8/2012 | Nakatsugawa et al. |
| 2012/0217834 A1 | 8/2012 | Lutz et al. |
| 2016/0006304 A1* | 1/2016 | Tojima ................. H02K 1/2706 310/154.02 |

FOREIGN PATENT DOCUMENTS

| | | |
|---|---|---|
| CN | 104333197 A | 2/2015 |
| CN | 104917310 A | 9/2015 |
| EP | 2306619 A2 | 4/2011 |
| GB | 2437568 A | 10/2007 |
| JP | 2007181370 A | 7/2007 |
| KR | 1020140017943 | 3/2014 |
| WO | WO2015137392 | 4/2017 |

OTHER PUBLICATIONS

The International Search Report and Written Opinion for PCT Application No. PCT/GB2017/050011, dated Apr. 5, 2017, 17 pages.

* cited by examiner

MAGNETICALLY GEARED APPARATUS

This application is a national stage application of an international patent application PCT/GB2017/050011, filed Jan. 5, 2017, which claims priority to Great Britain Patent Application No. 1600654.6, filed on Jan. 13, 2016, which applications are hereby incorporated by reference in their entirety.

FIELD

The disclosure relates to a magnetically geared apparatus. Specifically, this disclosure relates to a stator for use in a magnetically geared apparatus.

BACKGROUND

A known magnetically geared apparatus 100 is shown in FIG. 1. Such an apparatus acts as a motor/generator and is typically made up of an inner rotor 102 with inner permanent magnets 104 having a low number of magnet poles, a modulating rotor 106 with a number of pole-pieces 108 and an outer stator 110 having an array of outer permanent magnets 112 with a high pole number. The flux from the inner magnets 104 is modulated by the array of pole-pieces 108 in the modulating rotor 106 to create a number of harmonics on the outer surface of the pole-pieces 108. The dominant harmonic links with the fundamental field of the outer permanent magnets 112 to create a magnetic gear. The fundamental component of the inner rotor 102 magnet flux links with the stator 110 and it is this fundamental component of flux that gives rise to a back-emf in stator windings 103 of a pseudo-direct drive machine (magnetically geared motor/generator). The magnitude of this fundamental component of flux dictates the magnitude of the back-emf for a given speed. The higher this fundamental component of flux, the lower the current required to provide a given output torque. Copper losses in the stator windings are proportional to the square of the current. A typical flux path 114 linking two magnetic poles of such a magnetically geared device 100 is shown in FIG. 1.

The magnetically geared device 100 could be used as a motor/generator. The outer magnets 112 of such motor/generators are mounted to the bore of the stator 110 with an adhesive. Such motor/generators have a small circumferential gap between each of the outer magnets 112 to cope with engineering tolerances. This is normally filled with a non-magnetic encapsulant for structural purposes. The circumferential gaps between the individual magnets 112 are made as small as possible within engineering tolerances to maximise the amount of magnet material and thus increase the torque density of the magnetic gear part of the motor/generator.

SUMMARY

According to an aspect, a magnetically geared apparatus comprises: a first rotor; and a stator comprising windings and a first plurality of permanent magnets, the first plurality of permanent magnets being located between the windings and the first rotor; the stator comprising un-magnetised magnetisable material between circumferentially juxtaposed permanent magnets of the first plurality of permanent magnets.

Optionally, the un-magnetised magnetisable material projects in a substantially radial direction between the permanent magnets. The un-magnetised magnetisable material may project to at least a radially inner edge of the permanent magnets. The un-magnetised magnetisable material may project beyond the radially inner edge of the permanent magnets.

The un-magnetised magnetisable material may form a flux path with a core on which the windings are mounted. The un-magnetised magnetisable material and core may be integral.

Optionally, the first rotor comprises a second plurality of permanent magnets.

Optionally, the stator comprises radially outer and radially inner portions, the un-magnetised magnetisable material forming part of the radially inner portion.

Optionally, the stator is formed as a ring structure.

Optionally, the first rotor and stator are concentric, the stator being radially outer of the first rotor.

Optionally, the magnetically geared apparatus further comprises a second rotor radially between the first rotor and the stator. The second rotor may comprise a plurality of pole pieces.

Optionally, the stator comprises the un-magnetised magnetisable material.

Optionally, the first plurality of permanent magnets are embedded in the stator.

Optionally, the un-magnetised magnetisable material forms a bridge between the juxtaposed permanent magnets of the first plurality of permanent magnets.

Optionally, a portion of the un-magnetised magnetisable material is located between the first plurality of permanent magnets and the first rotor and/or the second rotor. The portion may extend circumferentially between the first plurality of permanent magnets and the first rotor and/or second rotor.

Optionally, the un-magnetised magnetisable material encloses at least one of the first plurality of permanent magnets. The un-magnetised magnetisable material may extend around the perimeter of at least one of the first plurality of permanent magnets.

Optionally, the un-magnetised magnetisable material retains at least one of the first plurality of permanent magnets to the stator.

Optionally, the un-magnetised magnetisable material is electrical steel or a soft magnetic composite.

Optionally, the stator comprises axially layered stator laminations. One or more of the stator laminations may comprise the un-magnetised magnetisable material between the circumferentially juxtaposed permanent magnets of the first plurality of permanent magnets.

Optionally, at least one of the first plurality of permanent magnets comprises axially layered permanent magnet laminations. The permanent magnet laminations may have a greater axial thickness than the stator laminations.

Optionally, two stator laminations each comprise un-magnetised magnetisable material between circumferentially juxtaposed permanent magnets of the first plurality of permanent magnets.

Optionally, each permanent magnet lamination is retained by only one stator lamination comprising un-magnetised magnetisable material between circumferentially juxtaposed permanent magnets of the first plurality of permanent magnets. Alternatively, each permanent magnet lamination may be retained by at least two stator laminations comprising un-magnetised magnetisable material between circumferentially juxtaposed permanent magnets of the first plurality of permanent magnets.

Optionally, one in two stator laminations comprises un-magnetised magnetisable material between circumferentially juxtaposed permanent magnets of the first plurality of permanent magnets. Alternatively, one in three stator laminations may comprise un-magnetised magnetisable material between circumferentially juxtaposed permanent magnets of the first plurality of permanent magnets. Alternatively, one in four stator laminations may comprise un-magnetised magnetisable material between circumferentially juxtaposed permanent magnets of the first plurality of permanent magnets. Alternatively, one in five stator laminations may comprise un-magnetised magnetisable material between circumferentially juxtaposed permanent magnets of the first plurality of permanent magnets Optionally, the un-magnetised magnetisable material comprises axially layered material laminations.

Optionally, the stator comprises radially outer and radially inner portions, the un-magnetised magnetisable material forming part of the radially inner portion, the radially inner portion being fixed to the radially outer portion. The first plurality of permanent magnets may form part of the radially inner portion.

Optionally, the un-magnetised magnetisable material extends through the first plurality of permanent magnets. The un-magnetised magnetisable material may extend radially and/or circumferentially through the first plurality of permanent magnets. The un-magnetised magnetisable material may divide at least one of the permanent magnets into a plurality of permanent magnet portions.

Optionally, the magnetically geared apparatus is a motor/generator, and the second rotor is an output/input shaft of the motor/generator.

The first rotor may comprise a second plurality of permanent magnets, and the first rotor may be arranged to interact with the second rotor in a magnetically geared manner. The windings may be arranged to magnetically interact with the first or fundamental harmonic of the magnetic field of the second plurality of permanent magnets.

Optionally, first plurality of permanent magnets has a respective first number of pole-pairs, and the second plurality of permanent magnets has a respective second number of pole-pairs, wherein the at least one pole piece is arranged to modulate the magnetic fields of the first and second pluralities of permanent magnets to produce mutually matching pole-pairs, thereby enabling magnetic coupling and torque transmission between the first and second pluralities of permanent magnets, and wherein the windings are arranged to magnetically couple with the first or fundamental harmonic of the magnetic field of the second plurality of permanent magnets.

The first and second rotors may be configured to transfer torque therebetween in a magnetically geared manner. Optionally, the first rotor is mechanically coupled to one of an input or output shaft, and the second rotor is mechanically coupled to the other of an input or output shaft.

FIGURE LISTING

Specific embodiments in which the invention is embodied are described below by way of example only and with reference to the accompanying drawings, in which.

DETAILED DESCRIPTION

Current passing through windings of a stator results in copper losses due to the conductor resistance. As the skilled person would understand, copper losses are an undesired loss of energy as heat and this leads to the temperature of the windings increasing in operation. Copper losses in the stator windings are proportional to the square of the current, and therefore at high currents the losses become increasingly significant. One way of reducing copper losses is to reduce the "current density" by increasing the copper cross-section for a given required current in each stator slot. However, such a change increases the mass and cost of the stator, and would necessarily require deeper slots if the outer diameter of the stator is to remain the same. Such deeper slots would also require that the rotor diameter is reduced (due to an increase in stator thickness), thereby undesirably reducing the active airgap area (shear airgap) for producing torque.

Another way of reducing copper losses significantly is by reducing the current, however such a reduction in current, without any other changes, would result in a decrease in torque in a magnetically geared apparatus incorporating the stator windings. Therefore, in order to compensate for the reduced current in the windings without compromising torque, the torque per amp must be increased.

Figure 1:
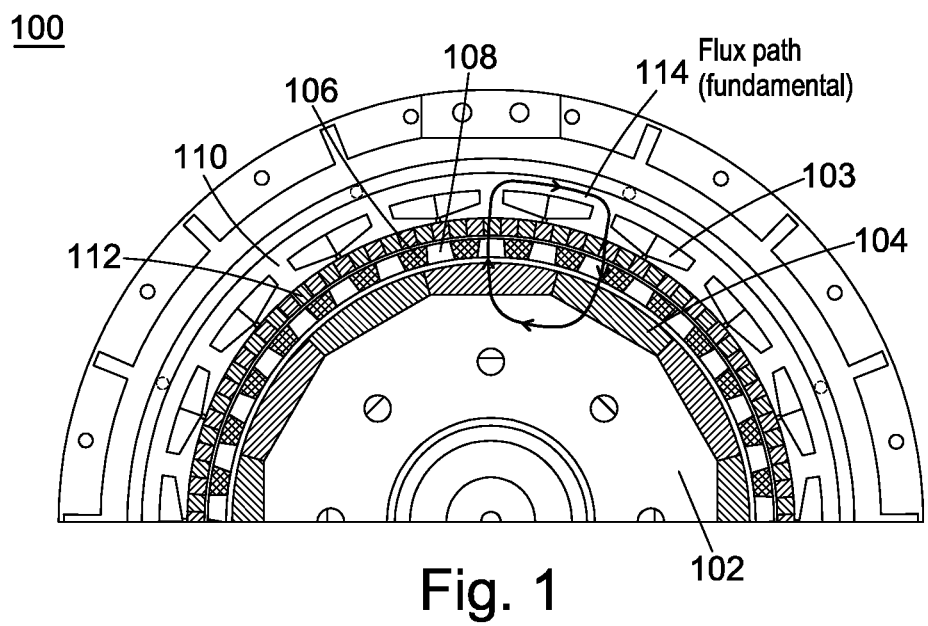
FIG. 1 is an axial view of a prior art motor/generator.

In the context of the magnetically geared motor/generator of FIG. 1, the torque per amp may be increased by increasing the magnitude of the fundamental flux 114 from the inner magnets 104 reaching the stator 110. Introducing a highly magnetically permeable material (soft iron interpoles) between each individual outer (stator) magnet 112 results in a lower reluctance path between the inner magnets 104 and the outer magnets 112, in turn providing an increase in the fundamental component of the inner magnet flux reaching the stator 110, and thus the flux linking the windings 103 is increased. This acts to increase the torque per amp without having to increase the current. As the copper losses are proportional to the inverse square of the torque per amp, a reduction in the copper losses is provided.

Figure 2:
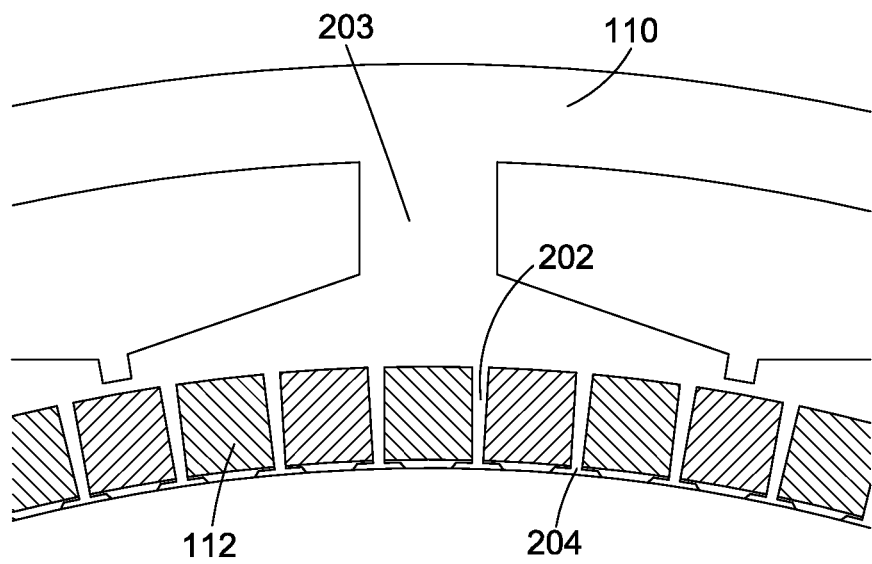
FIG. 2 is an axial view of an embodiment of a stator for a magnetically geared apparatus.

Turning to FIG. 2, in an embodiment a highly magnetically permeable material (magnetic material, for example lamination steel such as silicon iron) is provided between the magnets 112 of the stator 110 to form a radial bridge 202. The magnetic material between the magnets 112, provided by the radial bridge 202, reduces the reluctance of the magnetic circuit from the inner magnets 104 to the stator 110, and thus the flux coupling of the circuit increases. By introducing a "foot" 204 to the radial bridge 202 as shown in FIG. 2, the fundamental flux in the stator 110 can be increased further. The foot 204 acts to "collect" flux from the air gap between the stator 110 and the modulating rotor 106 and direct the flux to the windings 103. The flux can be thought of as the product of the air gap flux density and the area of flux "collecting" material. The foot 204 adds an additional area of low reluctance material facing the airgap to direct flux through to the radial bridge 202, which in turn directs flux into the main core/tooth body 203 of the windings 103, to link with the windings 103. This flux would otherwise have potentially leaked back to the adjacent magnet pole without linking with the windings 103, or the flux may have taken a route through the permanent magnets 112 which presents a high reluctance path as the permanent magnets have a permeability similar to air. Therefore, the foot 204 increases the amount of flux linking with the windings 103.

As shown in FIG. 2, the highly magnetically permeable material between the magnets 112 of the stator 110 may be a radial bridge of high permeability material. Such a bridge is placed between adjacent magnets 112. The high permeability radial bridge could be made from a magnetic material such as laminated electrical steel or a soft magnetic composite, for example. The high permeability radial bridge could be placed between each individual magnet 112, or between every second, third magnet 112 or other number magnet 112.

Figure 3:
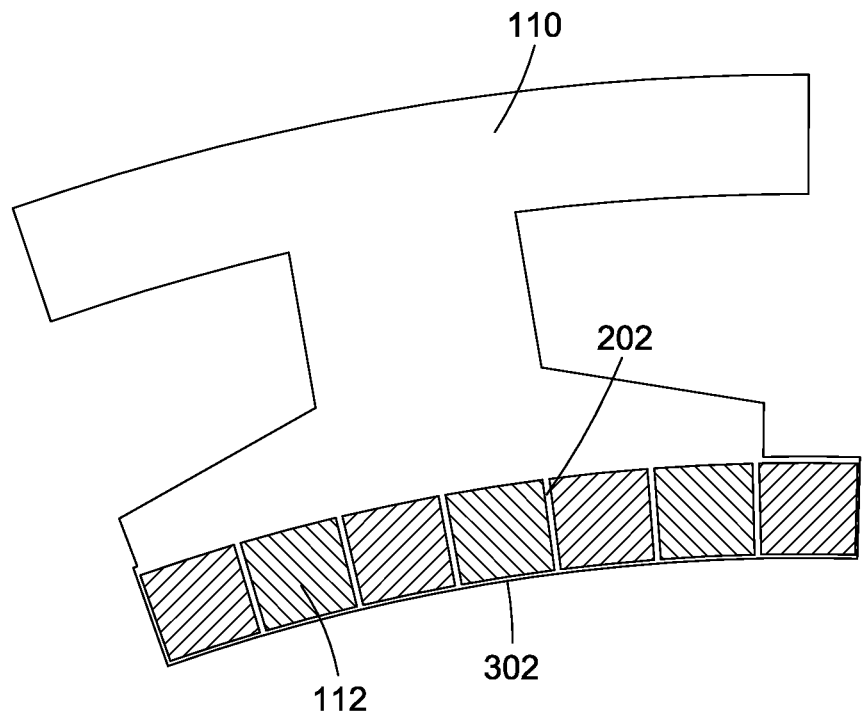
FIG. 3 is an axial view of another embodiment of a stator for a magnetically geared apparatus.

Turning to FIG. 3, in an embodiment, the "foot" 204 of FIG. 2 may extend further to complete a circumferential bridge 302 at the base of the stator magnets 112. This results in the magnets sitting in a "cage" of steel as shown in FIG. 3. The circumferential bridge 302 is best applied to larger machines, where the size of the bridge can be made relatively small compared to the magnet size. Manufacturing tolerances limit the bridge 302 to an absolute value of around 0.4 mm, so machines in which the magnets used have a pole width smaller than about 5 mm are not suitable for this technique.

An advantage of the circumferential bridge 302 of FIG. 3 is that, as the radial inter-pole sections (radial bridges 202) of the stator 110 are linked together circumferentially at the bore of the array of magnets 112, improved mechanical robustness is provided during manufacture. In this way, the radial sections (radial bridges 202) are reinforced during manufacture and the magnet forces are borne by a stronger structure (FIG. 3 shows the circumferential bridges 302 providing a full bridge over the magnets 112). Additionally, the fundamental flux in the stator 110 is increased further as the magnetic material surrounds the magnets 112.

The magnets 112 may be a single piece (in the X-Y plane, the Z axis defining an axis of rotation of the device rotors 102, 106). In an embodiment shown in FIG. 4, the magnets 112 are made up of multiple parts 112a-112i.

The magnets 112 may be inserted in a "pocket" or "box" of the highly magnetically permeable material of the stator 110, as shown in FIG. 3, without the use of adhesive (an adhesive could be introduced later in a single operation for all magnets). By virtue of the stiff "box" containing the magnets, a means of reacting forces through a damping medium may be utilised to provide mechanical damping.

Figure 5:
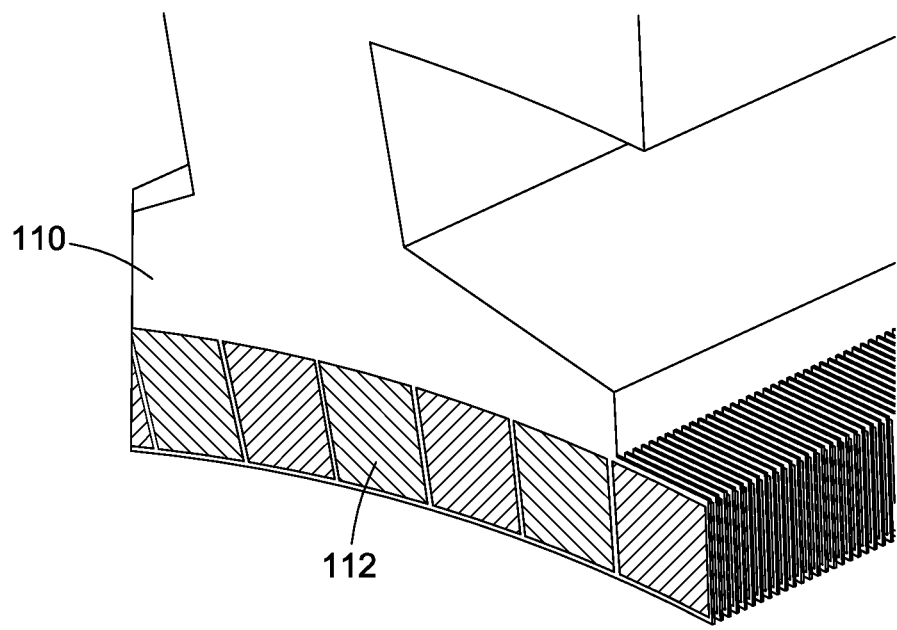
FIG. 5 is a perspective view of another embodiment of a stator for a magnetically geared apparatus.

The stator 110 could be laminated, as shown in FIG. 5. The radial bridge sections of the stator 110 can be part of the main stator lamination (that includes the back iron, teeth etc.) or separate therefrom.

The stator laminations may be produced by stamping, by LASER or by wire erosion or any other method known to electrical machine manufacturers.

Figure 6:
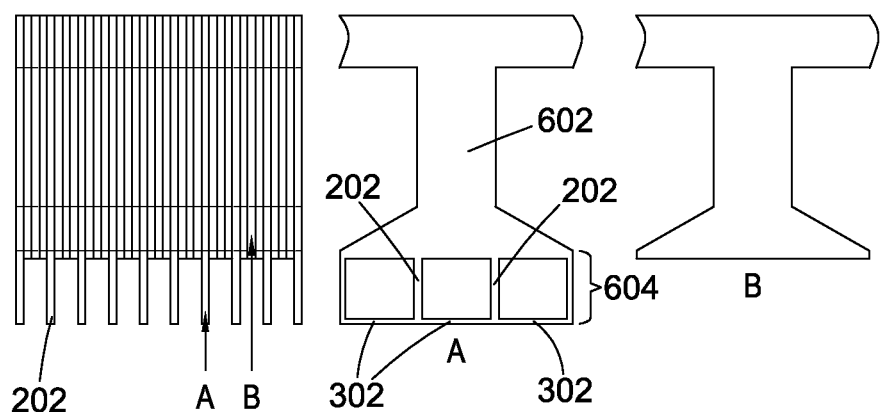
FIG. 6 is an axial and a radial view of an embodiment of a laminated stator.

In an embodiment, the stator 110 may be laminated as shown in FIG. 6. FIG. 6 shows an upper stator lamination B, and a stator lamination A having both an upper portion 602 (corresponding to the upper stator lamination B) and a lower portion 604. The lower portion 604 has the "pockets" or "boxes" for the permanent magnets 112. The left hand side of FIG. 6 shows a radial view of the stator laminations A and B. Different stator lamination shapes may be stamped to produce a stack of laminations where the radial bridge features (radial bridges 202 and circumferential bridges 302, present in stator lamination A) are only present in a proportion of the full stack length, i.e. the laminations with bridge features (A) are interleaved axially and/or circumferentially (see, for example, FIGS. 5 to 7).

Figure 7:
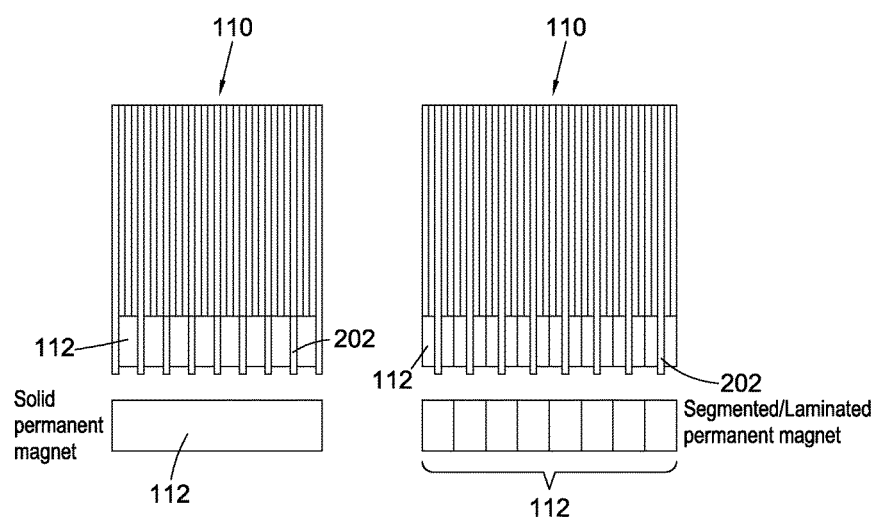
FIG. 7 is a radial view of the laminated stator of FIG. 6, including permanent magnet embodiments.

FIG. 7 shows 1 in every 4 laminations (left hand side of FIG. 7) and 1 in every 5 laminations (right hand side of FIG. 7) having the bridge feature. FIG. 7 also shows that the permanent magnets 112 may be a single piece (left hand side), or in an embodiment the permanent magnets 112 may be segmented or laminated (right hand side). It can be seen that the laminations or segments of the permanent magnet 112 are thicker in the axial direction than the laminations of the stator 110. As shown on the right hand side of FIG. 7, the stator 110 and magnets 112 may be such that each permanent magnet only has one corresponding stator lamination (A) with a bridge feature, however each permanent magnet may have multiple corresponding stator laminations (A) with a bridge feature.

For the stator 110, the lamination bridges are present to increase the fundamental flux reaching the stator 110. Known stators do not require such bridges as they do not have magnets mounted on them increasing the effective airgap between the magnets providing fundamental flux and the stator carrying the windings. This approach allows magnets to be attached to the stator securely without adding such an effectively large airgap in the magnetic circuit, as the steel laminated radial bridge sections provide a low reluctance path at this point in the magnetic circuit. In other words, the airgap in the magnetic circuit is reduced by virtue of the radial bridges 202, and is further reduced when the circumferential bridges 302 are used as well. This is fundamentally different to existing PDD stator technology, and no other conventional stator technology utilises magnets on the bore of the stator.

Figure 4:
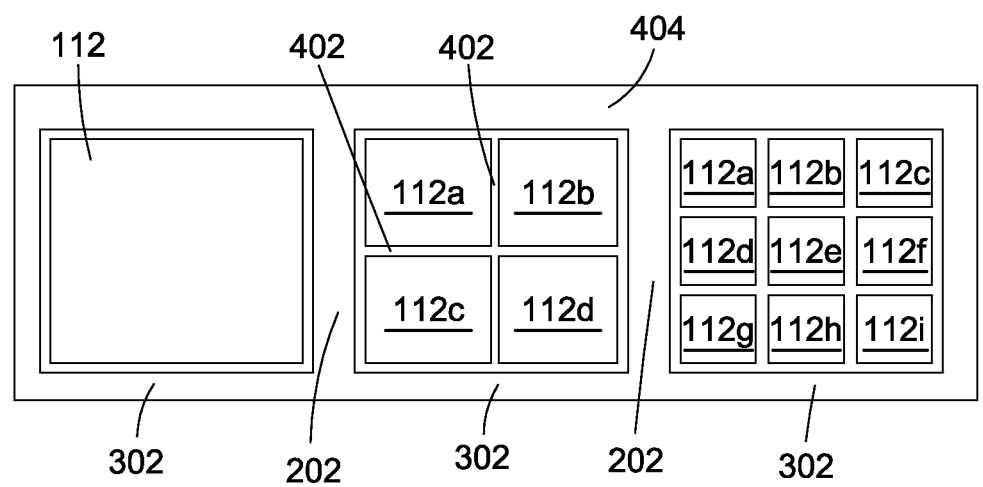
FIG. 4 is an axial view of various embodiments of part of a stator for a magnetically geared apparatus.

As shown in FIG. 4, a separate lamination with inner bridges 402, outer bridges (circumferential bridges 302 and outer bridges 404) and radial bridges 202 similar to that shown in FIG. 4 may be manufactured and the magnets inserted in to this component. This sub-assembly could then be attached to the stator lamination stack at a later date.

The following advantages are realised:

Increased fundamental flux due to soft iron inter-poles between magnets, formed as radial bridges 202, and optionally as circumferential bridges 302 as well. As a result of the increased fundamental flux, a reduction in copper volume is provided as the torque per amp is increased, therefore reducing the size of windings required to achieve the same torque. Further, the efficiency of the machine is improved, as a) flux leakage is minimised due to the improved magnetic circuit, and b) less current is required (due to the increased torque per amp), reducing copper losses.

A machine with reduced axial length may be provided. As the flux is increased by the machine disclosed herein, the amount of copper winding required is reduced while achieving the same performance. Less copper winding means that the slot area in the stator can also be reduced, thereby providing a stator of reduced radial thickness. For applications in which the outer diameter of the machine is fixed (i.e. cannot be increased), having a thinner stator (reduced axial thickness) increases the inner diameter of the stator. This provides a larger diameter for the permanent magnets 112 than would be provided by a thicker stator. As the skilled person would understand, the torque produced by a magnetic gear is a function of airgap shear stress (determined by the achievable airgap flux density), the surface area of the airgap and the "torque arm", i.e. the airgap shear force multiplied by the distance on which it acts from the shaft axis. As the diameter for the permanent magnets 112 is increased, the torque arm is increased and the surface area per unit length is also increased. Accordingly, the axial length of the machine can be reduced while providing at least the equivalent performance of a longer machine.

Adhesives not required (only gap filling medium between magnets and side walls of laminations), as the radial and circumferential bridges securely retain the magnets 112.

Magnets can be "posted" in to slots formed by the radial and circumferential bridges (the "pocket" or "box") quickly for high speed manufacture.

Multi-directional segmentation of the magnets, as shown in FIG. 4, can be employed without the fear of a magnet entering the airgap (due to poor adhesive properties or human error in manufacturing). This reduces losses considerably, especially in large machines with large magnet cross-sectional areas.

Magnet coating specification can be reduced as the magnets can be sufficiently protected by a standard Vacuum Pressure Impregnation (VPI) procedure. In prior machines, an additional protective coating (such as an Ni—Cu—Ni plating or epoxy coating) is typically applied to permanent magnets as such magnets are exposed. When such magnets are bonded to a stator surface, the strength of the bonding is only as good as the adhesion of the protective coating to the magnet. In the machine disclosed herein, no protective coating is required as the magnets are protected by virtue of a secure "cage" formed by the radial bridges 202 and the circumferential bridges 302. The conventional VPI procedure can then be used to bond the magnets into the structure while providing sufficient corrosion protection. The skilled person would understand the details of a conventional VPI procedure.

Magnets are protected from damage during manufacture, and the magnets are protected from damage from any foreign object entering the airgap. Such protection is provided by the secure "cage" formed by the radial bridges 202 and the circumferential bridges 302.

Improved thermal contact with the stator 110, and thus reduced thermal resistance between magnet and coolant. This results in lower operating temperatures and thus higher magnet flux and/or selection of a lower coercivity magnet grade (cheaper) with reduced content of heavy rare earth (i.e. Dysprosium).

Applicable to stamped parts, LASER parts etc. Therefore a high volume manufacturing solution is provided.

The invention claimed is:

1. A magnetically geared apparatus comprising:
a first rotor comprising a plurality of first permanent magnets;
a stator comprising windings and a plurality of second permanent magnets, the plurality of second permanent magnets being located between the windings and the first rotor; and
a second rotor radially between the first rotor and the stator, the second rotor comprising a plurality of pole pieces;
the stator further comprising un-magnetised magnetisable material between circumferentially juxtaposed second permanent magnets, wherein the un-magnetised magnetisable material projects in a radial direction between the circumferentially juxtaposed second permanent magnets, projects to a radially inner edge of the plurality of second permanent magnets, and includes a plurality of foot portions which each extend circumferentially along the radially inner edge so as to partially encase each of the second permanent magnets.

2. The magnetically geared apparatus of claim 1, wherein the un-magnetised magnetisable material projects beyond the radially inner edge.

3. The magnetically geared apparatus of claim 1, wherein the un-magnetised magnetisable material forms a flux path with a core on which the windings are mounted.

4. The magnetically geared apparatus of claim 3, wherein the un-magnetised magnetisable material and the core are integral.

5. The magnetically geared apparatus of claim 1, wherein the stator comprises radially outer portions and radially inner portions, the un-magnetised magnetisable material forming part of the radially inner portions.

6. The magnetically geared apparatus of claim 1, wherein the stator is formed as a ring structure.

7. The magnetically geared apparatus of claim 1, wherein the first rotor and the stator are concentric, the stator being radially outer of the first rotor.

8. The magnetically geared apparatus of claim 1, wherein the stator comprises the un-magnetised magnetisable material.

9. The magnetically geared apparatus of claim 1, wherein the second permanent magnets are embedded in the stator.

10. The magnetically geared apparatus of claim 1, wherein the un-magnetised magnetisable material forms a bridge between the circumferentially juxtaposed second permanent magnets.

11. The magnetically geared apparatus of claim 1, wherein the foot portions are located between the plurality of second permanent magnets and the first rotor.

12. The magnetically geared apparatus of claim 11, wherein the foot portions are located between the plurality of first permanent magnets and the second rotor.

* * * * *